US012700196B2

(12) United States Patent
Guionnet et al.

(10) Patent No.: US 12,700,196 B2
(45) Date of Patent: Aug. 4, 2026

(54) AUGMENTED REALITY-BASED TIME ADJUSTMENT

(71) Applicant: Orange, Issy-les-Moulineaux (FR)

(72) Inventors: Chantal Guionnet, Chatillon Cedex (FR); Alexandre Audoin, Chatillon Cedex (FR)

(73) Assignee: Orange, Issy-les-Moulineaux (FR)

( * ) Notice: Subject to any disclaimer, the term of this patent is extended or adjusted under 35 U.S.C. 154(b) by 106 days.

(21) Appl. No.: 18/716,898

(22) PCT Filed: Dec. 5, 2022

(86) PCT No.: PCT/EP2022/084350
§ 371 (c)(1),
(2) Date: Jun. 5, 2024

(87) PCT Pub. No.: WO2023/104686
PCT Pub. Date: Jun. 15, 2023

(65) Prior Publication Data
US 2025/0046023 A1 Feb. 6, 2025

(30) Foreign Application Priority Data
Dec. 6, 2021 (FR) ........................................ 2112978

(51) Int. Cl.
*G06T 19/00* (2011.01)
(52) U.S. Cl.
CPC .................................. *G06T 19/006* (2013.01)
(58) Field of Classification Search
CPC ....... G06T 19/006; G06T 19/00; G06T 19/20; G06T 15/00; G06T 15/005; G06T 15/04;
(Continued)

(56) References Cited

U.S. PATENT DOCUMENTS

| | | | |
|---|---|---|---|
| 9,286,711 B2 * | 3/2016 | Geisner | ................... G06T 15/00 |
| 11,475,644 B2 * | 10/2022 | Bailey | ................... G06F 3/0346 |

(Continued)

FOREIGN PATENT DOCUMENTS

KR 102198280 B1 1/2021

OTHER PUBLICATIONS

Duguleana et al., "Time-Travelling with Mobile Augmented Reality: A Case Study on the Piazza dei Miracoli", SAT 2015 18th International Conference, Austin, TX, USA, Sep. 24-27, 2015; Lecture Notes in Computer Science; Lect. Notes Computer, Springer, Berlin, Heidelberg, pp. 902-912, Oct. 31, 2016.

(Continued)

*Primary Examiner* — Vijay Shankar
(74) *Attorney, Agent, or Firm* — Knobbe, Martens, Olson & Bear, LLP

(57) ABSTRACT
A method of temporal instantiation for an augmented-reality digital service. The method includes: a) obtaining an indication of a chosen date within a predefined time coverage interval, b) accessing a library of 3D temporal objects, a 3D temporal object comprising a plurality of instances, an instance being a 3D object associated with a validity time interval forming a continuous portion of the time coverage interval. The method further includes, for at least one 3D temporal object in the library of which an instance is associated with a validity time interval including the chosen date: c) selecting, from the library, only the instance associated with the validity time interval that includes the chosen date, and d) delivering the selected instance with a view to rendering it for a user. An associated computer program and storage medium are also provided.

15 Claims, 5 Drawing Sheets

(58) Field of Classification Search
CPC ....... G06T 15/10; G06T 15/205; G06T 17/00;
G06T 17/05; G06F 3/04815; G06F
3/04847; G06F 3/011
See application file for complete search history.

(56)                References Cited

U.S. PATENT DOCUMENTS

| | | | | |
|---|---|---|---|---|
| 11,656,682 | B2 * | 5/2023 | Roberts .............. | H04N 21/4621 |
| | | | | 345/156 |
| 11,763,527 | B2 * | 9/2023 | Allen .................... | G09B 5/125 |
| | | | | 345/419 |
| 11,948,259 | B2 * | 4/2024 | Chakravarthi .......... | G06F 3/011 |
| 11,995,244 | B2 * | 5/2024 | Bradski ................ | H04N 21/414 |
| 2013/0083011 | A1 | 4/2013 | Geisner et al. | |
| 2024/0062477 | A1 * | 2/2024 | Chakravarthi .......... | G06F 3/011 |

OTHER PUBLICATIONS

International Search Report for International Patent Application No.
PCT/EP2022/084350, dated Feb. 23, 2023.

* cited by examiner

AUGMENTED REALITY-BASED TIME ADJUSTMENT

CROSS-REFERENCE TO RELATED APPLICATIONS

This application is filed under 35 U.S.C. § 371 as the U.S. National Phase of Application No. PCT/EP2022/084350 entitled "AUGMENTED REALITY-BASED TIME ADJUSTMENT" and filed Dec. 5, 2022, and which claims priority to FR 2112978 filed Dec. 6, 2021, each of which is incorporated by reference in its entirety.

BACKGROUND

Field

This disclosure relates to the field of augmented reality.

Description of the Related Technology

Augmented reality is a digital technology that is increasingly used at cultural sites. Generally speaking, it is a tool intended to enhance the experience of the general public. For example, it is possible to immerse a viewer in a reconstruction of a historical battle, or to highlight architectural elements or works of art.

In augmented reality, the insertion of dynamic objects into the user's visual field is carried out through a digital service. This service may be integrated into specific glasses or may be a module of an application running on a digital tablet or smartphone.

The objects are dynamic in that it is known to have them evolve according to the physical movements of the user at a real location, and according to actions assigned to them by the digital service or by the user. These object evolutions include, for example, an appearance, a disappearance, a translation, a rotation, a zoom in, a zoom out, an adjustment in the color, brightness, or contrast, a deformation related to the position, etc. These object evolutions may be provided for when the objects are defined as 3D models. Most often, the objects are 3D animations, meaning 3D models whose appearance evolves in a predefined manner over time during the augmented reality experience.

For example, it is known, during an augmented reality experience, to insert 3D objects which come from a library, and to adjust these objects in size, viewing angle, positioning, visual adaptation, etc., according to data about the user's movement within the space, from their glasses or from their smartphone. Each 3D object is thus defined by a series of parameters which allow such visual adjustment in the space. FIG. 1 represents three successive views 100, 101, 102 of the same chateau in an augmented reality experience, as the user moves physically closer to the entrance to the chateau. In these views, three 3D objects 1, which come from a library 2, are represented at specific positions that are fixed in relation to the environment. These objects 1 are enlarged as the user approaches their position while he or she is moving about within the environment.

The inserted dynamic objects therefore evolve during the time of the augmented reality experience, but only as a function of the time which passes during this augmented reality experience while the user is moving about at the site where the experience is offered. The interactivity of the experience is therefore limited to the user's movements and to the user's interactions with the objects.

The absence of any dynamic adjustment of the "current temporal frame of reference" variable in the experience thus prevents a user from having a same experience of today's reality augmented by objects or people from one or more of any chosen past eras. However, the same site may have existed for several years, even several decades or hundreds of years, with associated objects of different shapes and appearances.

There is therefore a need for increased interactivity in augmented reality experiences. In particular, it would be desirable to allow users to make a dynamic choice of the period in which the experience is located and of the visual rendering associated with this period.

SUMMARY

This disclosure improves the situation.

A method of temporal instantiation for a virtual-environment digital service is proposed, the method comprising: providing the digital service with an instance of a temporal object associated with a validity time interval including a chosen date within a predefined time coverage interval, a temporal object comprising a plurality of instances, an instance being an object associated with a validity time interval forming a continuous portion of the time coverage interval, the validity time intervals associated with the instances of a same temporal object being non-overlapping.

"Virtual-environment digital service" is understood to mean any service offering, to one or more users, a virtual environment which may or may not be superimposable (as in augmented reality) over a real environment. The environment may be 2D or 3D and may or may not be immersive. The environment may be reconstructed for example using a virtual and/or augmented reality headset or holograms.

An "object" designates a virtual thing that a user of the service can manipulate by interaction. It may be a thing assigned to a specific virtual use, such as a floor lamp or a table, or a virtual person and/or an avatar. Objects may be either 2D or 3D, static or animated.

The time coverage interval, the validity time intervals, and the chosen date should be considered as systematically referring to a virtual time frame that is different from the actual time frame.

Thus, an experience in a virtual environment which may actually last several tens of minutes may for example span a person's life within a time coverage interval of several decades, by means of instances of the person which in turn are child, adolescent, young adult, and middle age. Depending on the chosen date at any moment within the time frame in effect, the valid instance of the temporal object representing the person is not the same.

Furthermore, the concept of time frame provided for by the development, in particular the association with time intervals and not simply with different dates for the instances of a temporal object, has the advantage of allowing a continuous evolution over time and not a discontinuous access to fixed dates/periods.

The proposed method offers the possibility of personalizing an experience in a virtual environment by choosing a particular date. This choice may be made either beforehand or interactively by the user as the experience unfolds. The experience is automatically adapted by providing appropriate instances of temporal objects based on the chosen date.

When the method is repeated, by the same user or by different users, for different chosen dates, the instance(s)

provided may therefore differ from one iteration of the method to another, with the consequence of modifying the resulting experience.

According to another aspect, a computer program is proposed comprising instructions for implementing all or part of a method as defined herein when the program is executed by a processor. According to another aspect, a non-transitory computer-readable storage medium is provided, on which such a program is stored.

According to another aspect, a library of temporal objects is proposed, a temporal object comprising a plurality of instances, an instance being an object associated with a validity time interval forming a continuous portion of the time coverage interval, the validity time intervals associated with the instances of a same temporal object being non-overlapping.

According to another aspect, an instance generator intended for a virtual-environment digital service is proposed, the generator comprising at least: a provider of an instance of a temporal object associated with a validity time interval including a date chosen within a time coverage interval predefined in the digital service, a temporal object comprising a plurality of instances, an instance being an object associated with a validity time interval forming a continuous portion of the time coverage interval, the validity time intervals associated with instances of a same temporal object not being overlapping.

The generator may further comprise, in particular: an obtainer of an indication of a date chosen within a predefined time coverage interval, and/or a connector to the above library of temporal objects, and/or an instance selector.

The features set forth in the following paragraphs may optionally be implemented, independently of each other or in combination with each other: When the date associated with the virtual environment changes during reproduction of the virtual environment, as soon as the current moment in the virtual environment leaves the validity time interval associated with the rendered instance of a temporal object in the reproduced virtual environment, a new instance of the temporal object is provided, associated with a validity time interval including the chosen date, the new instance having been generated on the basis of the date corresponding to the current moment in the virtual environment being reproduced, the validity time intervals associated with the provided instance and with the new instance being contiguous.

Thus, the fact that the temporal objects can evolve over time (transition from one instance to another) in very detailed time frames, on the order of a second, thus makes it possible to take into account the time of the VR experiences as an element in the evolution of objects (speed of evolution of objects=speed of the time passing in the virtual environment).

The date may be chosen on the basis of a signal received from a human-machine interface.

For example, such an interface may be made available to the user, enabling the user to choose a rendering of one scene among several possible renderings corresponding to different eras.

Such an implementation provides interactivity in the choice of a time period, resulting in a choice of a particular personalized experience according to the signal received. The personalized experience may therefore differ temporally from one user to another.

Optionally, such an interface may also be made available to a guide for a group of tourists, who can thus occasionally take control of the temporal dimension of the augmented reality experiences of the tourists in the group, and synchronize these experiences with certain explanations about the evolution of a scene over time.

The method may further comprise: adjusting an appearance of at least one selected instance according to a criterion based on associated data about the temporal evolution of the instance's appearance within the validity time interval of the selected instance and on the chosen date.

Thus, a given instance may for example be rejuvenated or aged in order to give it a different appearance according to the proximity of the chosen date to one of the limits of its validity interval.

The method may comprise: selecting, from the aforementioned library of temporal objects, the instance associated with the validity time interval which includes the chosen date.

The method may further comprise, when accessing the library of temporal objects prior to selecting an instance: filtering the library so as to preselect only the temporal objects for which an instance is associated with a validity time interval which includes the chosen date, and the selection being made among the preselected temporal objects in the filtered library.

Filtering the library in this way, by automatically excluding temporal objects for which no instance is likely to be rendered because of the chosen date, allows accelerating the subsequent operations of selecting instances with a view to rendering them. Indeed, it is more efficient, in terms of computation time, to select from a preselection of valid instances based on their validity interval, rather than selecting from the library as a whole. Such subsequent operations may occur, for example, when the user is moving about or is successively looking in different directions, which has the consequence of requiring a selection of instances according to a position criterion.

In particular, providing an instance of a temporal object associated with a validity time interval which includes a chosen date within a predefined time coverage interval is conditional upon the given temporal object having an instance for which the validity time interval includes the chosen date.

In particular, in the case where the given temporal object does not have instances for which the validity time interval includes the chosen date, then the method includes providing information relating to an instance at the chosen date which includes an indication of non-rendering of the given temporal object at the digital service.

The method may further comprise: updating the chosen date on the basis of a request to change the chosen date, the updated chosen date being used when providing an instance of a temporal object associated with a validity time interval that includes the updated chosen date.

An instantaneous repositioning of the chosen date is a discontinuous variation of the chosen date by the assigning of a target value.

An evolution of the chosen date is an incremental variation of the chosen date, determinable on the basis of the current value of the chosen date, in a defined direction of evolution, for example towards the future, and at a defined speed, for example in the form of a variation in the chosen date relative to the time variation in effect during the augmented reality experience.

The request to change the chosen date may be obtained on the basis of a signal received from a human-machine interface.

A button, a wheel, or any other suitable interface may thus take on the function of a means for acquiring a command relating to repositioning the chosen date or to accelerating or slowing down the evolution of the chosen date in one direction or the other.

The updating of the chosen date may be based on data indicative of a speed of variation of the chosen date. This data may be included in the request to change the chosen date. For example, the request to change the chosen date may comprise data that indicates advancing the chosen date at a specific rate. Alternatively, the data indicative of a chosen date variation speed may be absent from the request to change the chosen date, and may be predefined by default. For example, the chosen date variation speed may be set to a specific value, based on one or more predefined rules, independently of the request to change the chosen date. This specific value may be a predefined absolute value, for example one year per second. Alternatively, this specific value may be a predefined relative value, ensuring that the updating is always carried out within the same period of time regardless of the amplitude of the difference between the updated chosen date and the chosen date before updating.

In particular, if the absolute value of the chosen date variation speed is less than or equal to a predefined threshold, the updating based on the data indicative of a chosen date variation speed may comprise: repeatedly updating the chosen date incrementally until a final chosen date is reached, then for each update.

In particular, if the absolute value of the chosen date variation speed is greater than a predefined threshold, the updating on the basis of the data indicative of a chosen date variation speed may comprise: updating the chosen date so as to directly reach a final chosen date.

Thus, when the speed of variation is high, there is only one updating of the chosen date.

In particular, the method may comprise: comparing the absolute value of the chosen date variation speed with at least one predefined threshold.

The chosen date may then be updated according to an update mode that is dependent on the result of the comparison. For example, the update mode will be an update mode by incrementing or by directly updating the chosen final date.

The predefined threshold is a limit speed below which the instances are updated step by step throughout the evolution of the chosen date, and beyond which the instances are updated only once, in the manner of an instant repositioning on the final chosen date. The predefined threshold may be based on a hardware and/or software performance criterion, or on a physiological criterion, in order to optimize user comfort during the augmented reality experience. Indeed, it is known for example that a sudden variation in the number of images per second displayed to a user causes visual discomfort.

Optionally, a first instance of a given temporal object having been provided prior to an updating of the chosen date, the first instance being associated with an indication of a limit date corresponding to a start and/or an end of the validity time interval associated with the first instance, the method may further comprise, if the updated chosen date is beyond the limit date: providing the digital service with information relating to an instance at the updated chosen date, the information relating to an instance at the updated chosen date comprising a second instance when the temporal object comprises a second instance having a validity time interval comprising the updated chosen date.

In particular, the information relating to an instance at the updated chosen date may include an indication of non-rendering of the given temporal object at the digital service.

In particular, the method may further comprise: Selecting as the second instance, in the given temporal object, an instance having a validity time interval which comprises the updated chosen date.

In particular, the method may further comprise: searching, in the library, for whether the given temporal object comprises a second instance having a validity time interval which comprises the updated chosen date.

Optionally, an instance of a given temporal object having been provided prior to an updating of the chosen date, the instance being associated with an indication of an intermediate date that is based on temporal evolution data about the instance appearance within the validity time interval, and the method may further comprise, if the updated chosen date is beyond the intermediate date: adjusting an appearance of said instance according to a criterion based on the temporal evolution data about the instance appearance and based on the updated chosen date.

Optionally, no instance of a given 3D temporal object having been provided prior to an updating of the chosen date, the method may further comprise, if the updated chosen date is beyond a limit date corresponding to a start and/or an end of the validity time interval associated with a given instance: providing the given instance to the augmented-reality digital service with a view to rendering it for the user.

It is thus possible to trace the temporal evolution of a scene marked by the appearance of objects, their disappearance, their replacement, or their change of appearance at particular moments.

BRIEF DESCRIPTION OF THE DRAWINGS

Other features, details, and advantages will become apparent upon reading the detailed description below, and upon analyzing the appended drawings, in which.

DETAILED DESCRIPTION OF CERTAIN ILLUSTRATIVE EMBODIMENTS

Figures 1, 2:
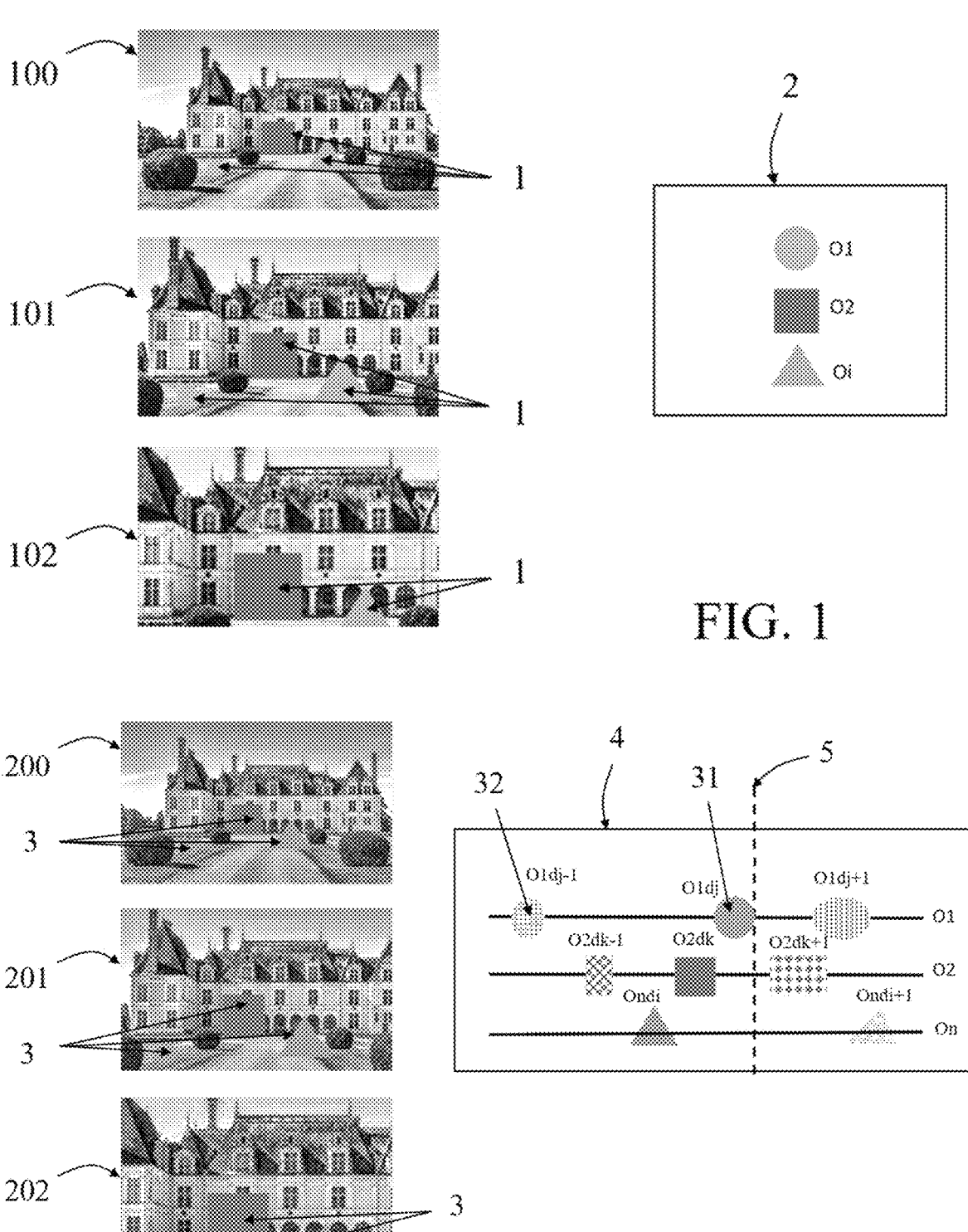
FIG. 1 shows a known integration of 3D objects in three views of a scene during an augmented reality experience.
FIG. 2 shows an integration of instances of 3D temporal objects in three views of a scene, on the same chosen date, according to one embodiment.

This development focuses on the insertion of objects into a virtual environment with the possibility of making dynamic temporal adjustments in their rendering, enabling access to user experiences corresponding to different times and dates and variable on demand and in real time. In a known manner, an object may have various properties adapted for its insertion into a compatible setting, with dynamic adaptation of its rendering in relation to the various spatial movements within the current setting: size, viewing angle, etc.

In addition, according to this development, each object has instances, or representations, associated with different time periods. Such an object having several instances is referred to in the remainder of this document as a temporal object. The extent of the validity of the instances may vary from one instance to another and from one temporal object to another. For example, a lamppost may keep the same shape over several years while a historical person may physically change more continuously. Thus, each instance of a temporal object is associated with start time information and end time information.

There are multiple advantages which arise from such instantiation.

The experience in the virtual environment is both continuous for the actual duration of the experience, and multi-temporal on demand via the possibility of navigating through time on demand during this experience.

The time frame of the experience is customizable by the user, meaning that the experience in the virtual environment encompasses a journey through time, at a pace and speed chosen by each user according to the range of possibilities offered.

Radical changes to the temporal frames of reference are made possible, as are variations in the speed of the temporal evolution of the experience.

For the purposes of the examples provided in this description, we consider a virtual-environment digital service to be an augmented-reality digital service. Needless to say, the development is not limited to the examples provided but is also applicable to any other virtual-environment digital service.

We also consider objects and temporal objects in 3D, in the various examples given. Here again, it should be noted that this development is also applicable to 2D objects.

In the examples provided, a user equipped with an augmented reality device is moving about within an actual location. Augmented reality device designates for example glasses, a headset, a touchscreen tablet, a smartphone, or more generally any device comprising means of rendering images by superimposing them over a scene within the user's visual field. The augmented reality device may be a communicating device, meaning it is equipped with a communication interface, for example wireless, with a data processing circuit. The augmented reality device, whether communicating or non-communicating, may itself also be equipped with such a data processing circuit.

Said data processing circuit(s) are configured to implement an augmented-reality digital service, and more particularly to implement a method of temporal instantiation for this digital service. Cloud computing technologies are applicable, with some software functions of the augmented-reality digital service able to be implemented locally by an augmented-reality communicating device and others remotely by another suitable device.

In this context, the augmented-reality digital service may be configured for example to obtain, at a given moment, an indication of a chosen date.

When the date associated with the virtual environment evolves during the reproduction of the virtual environment, as soon as the current moment in the virtual environment leaves the validity time interval associated with the rendered instance of a temporal object in the reproduced virtual environment, a new instance of the temporal object associated with a validity time interval including the chosen date is provided, the new instance having been generated on the basis of the date corresponding to the current moment in the virtual environment being reproduced, also called the virtual environment currently being rendered or the currently rendered virtual environment, the validity time intervals associated with the provided instance and the new instance being contiguous.

Reference is now made to FIG. 2, which shows views 200, 201, 202 of three scenes corresponding to three successive visual fields of the user who is moving towards the entrance of a chateau. In these views, 3D objects 3 are represented which, unlike those represented in FIG. 1, are instances of 3D temporal objects, these instances being selected from a library 4 of 3D temporal objects.

We consider in this example that, for each of the three views 200, 201, 202, the digital service is collecting the same indication of a chosen date 5 within a time coverage interval.

For example, the time coverage interval may extend over several centuries, from the period of the construction of the chateau to the current period. The chosen date then corresponds, for example, to a particular century, decade, year, month, week, or day, with the aim of offering different augmented reality experiences at a same site but corresponding to different eras. In another example, the time coverage interval may extend over only a few hours, in order to reconstruct the progression of a past event occurring on a particular day, and the chosen date 5 then designates a particular timestamp, expressed in hours, minutes, and/or seconds. It is understood from the above examples that the relevant unit for expressing the chosen date is chosen according to the extent of the time coverage interval and/or the temporal extent of the events to be represented.

The chosen date results, directly or indirectly, from a choice made by a user, or from a design choice.

For example, the initial chosen date, meaning the origin of the initial temporal frame of reference in an augmented reality experience, may arbitrarily designate the current date and time, or any other date in the past or the future which is imposed or in contrast is chosen beforehand by the user.

Dates chosen later on may be determined according to a current temporal frame of reference, defined as the combination of an origin, a direction of evolution, and a speed of evolution. The choice of the current temporal frame of reference in which the chosen date is determined, or directly the choice of the origin of such a frame of reference as the chosen date, may be made at the user's initiative, by means of any suitable human-machine interface. Such an interface may comprise for example one or more of the following elements: a mouse, a keyboard, a button, a wheel, a user interface displayed on a screen adapted to receive and process touch commands, a voice recognition module adapted to receive and process voice commands, etc. The human-machine interface is referred to in the remainder of this document by the generic expression "time variation commands".

In order to allow selecting among the different experiences that are able to be offered, the digital service is configured to access the library 4 of 3D temporal objects, which lists all the 3D objects able to be rendered for the user regardless of any condition such as the chosen date.

The library 4 thus comprises different 3D temporal objects, denoted O1, O2, On, etc. As explained above, each of these 3D temporal objects comprises one or more instances, each associated with a validity time interval. Temporal object O1 in the library thus has several possible alternative representations in FIG. 2 [ . . . , O1$dj$−1, O1$dj$, O1$dj$+1, . . . ].

More specifically, the 3D temporal object denoted O1 here comprises three consecutive instances. A first instance 31 has a validity time interval extending from O1$dj$ to O1$dj$+1, encompassing the chosen date 5. A second instance 32 has a validity time interval extending from O1$dj$−1 to O1$dj$. Finally, a third instance has a validity time interval extending from O1$dj$+1 to the end of the time coverage interval.

The validity time interval associated with an instance generally represents a continuous portion of the time coverage interval. This validity time interval is determined, for example, by:

a start date/time and an end date/time, or a start date/time and a time span extending towards the future, or an end date/time and a time span extending towards the past, or by the start dates of two consecutive instances.

It is understood that the validity time intervals of two instances of a same 3D temporal object do not overlap. In this manner, regardless of which 3D temporal object is under consideration, and regardless of the chosen date 5 within the time coverage interval, at most this date can only be included in the validity interval of only one of the instances of the object considered.

In this manner, it is possible, for a given 3D temporal object, to render one instance for the user rather than another, based on the chosen date. It is also possible, for certain chosen dates or chosen time intervals, not to render any instance of a given 3D temporal object. Thus, it is possible, for example, to represent the appearance of the same architectural element or furnishing at different eras, or the appearance of the same person at different periods in their life. In addition to the instantiation mentioned, it is also possible to predict and apply, for a given instance, one or more variable attributes. For example, the appearance of a given instance may be modulated by temporal "aging" or "rejuvenation" implemented by a change in texture or by slight visual distortions.

Each 3D temporal object, denoted "3DTemporalObject", is thus defined by a set of linked instances, denoted "3DObject", each defined by a series of 3D parameters denoted "param" and associated with a validity time interval denoted "Interval".

$$3DObject(i) = \sum param(i)$$

$$3DTemporalObject(i) = \sum [Interval(j), 3DObject(j)]$$

The concept of a validity time interval may be refined, so that it is possible to subdivide such a validity time interval into non-overlapping subintervals.

Thus, for a given instance, it is possible to predict a plurality of possible appearances, each associated with a corresponding subinterval. These different possible appearances may be defined within the series of 3D parameters, denoted "param", mentioned above.

During the augmented reality experience, the relevant instances to be rendered are selected when different criteria are met.

It is known to render 3D objects on the basis of a criterion relating to the position or orientation of the user, for example when a location previously associated with the object enters the current visual field of the user. In FIG. 2, we thus consider that, for each of the three views 200, 201, 202, the digital service collects the demarcation of the user's corresponding visual field. The demarcation of the user's visual field can be easily determined by a person skilled in the art, from the position and orientation information of the augmented reality device, which is typically obtained via sensors integrated into the augmented reality device and/or into the user's environment. In the current case, the three visual fields are different because the position of the user, and therefore also that of the augmented reality device, is different.

Of course, in a known manner, the appearance of the selected instances may be adjusted as the user moves through the scene. Such adjustments may include, for example, the size, viewing angle, or positioning of the instance. These adjustments may be made on the basis of data about the spatial movement of the user or of the augmented reality device.

These adjustments may also be made according to the temporal evolution of various predefined parameters related to the scene and/or to the user's current environment, such as lighting parameters. In particular, adjusting the parameters of an object according to the temporal evolution includes adjusting the texture of an object. For example, a metal object will have a smooth texture at a given moment corresponding for example to its original appearance, then as the metal rusts over time, the texture of this object will change to represent this evolution in the rust.

In a first embodiment of this adjustment of parameters of a temporal object according to the temporal evolution of the virtual environment, several values of the parameters of the temporal object are pre-recorded with the different instances of the temporal object, and a value for at least one of the parameters is provided based on the chosen date and an origin date of the temporal object. This embodiment requires little computational power.

In a second embodiment of this adjustment of parameters of a temporal object according to the temporal evolution of the virtual environment, image processing generates images based on the image of the provided instance of the temporal object and on the temporal evolution of the virtual environment, in particular images of the texture, thus allowing the appearance of the temporal object to change continuously without providing new data (parameter values).

This document proposes, as a criterion for selecting the relevant instances to be rendered at a current moment, selecting only those instances whose validity time interval encompasses the chosen date. In the same way that an instance is selectable as long as its validity time interval includes the chosen date, it may be provided, more specifically, that a specific appearance of an instance is made selectable when the chosen date is located within the associated subinterval.

It is also possible to select more instances than those which are actually to be rendered at the current moment, according to a principle of caching.

For example, imagine that a user is moving about, leading to a change in his or her visual field. This has the consequence that a position associated with an instance of a 3D object which was not currently rendered, may enter the user's visual field. In anticipation of such a situation, it is for example possible to filter the library by chosen date, meaning to preselect all instances of objects whose validity time interval includes the chosen date. In such a case, an additional position criterion is applied to the preselected instances, so that only those whose position falls within the user's current visual field are then indeed selected for reconstruction.

In addition to accessing a library of 3D temporal objects, it is also possible to access, in parallel, a library of non-instanced 3D objects, so as to extract 3D objects having a constant appearance regardless of the chosen date. In this manner, the library of 3D temporal objects 4, as well as the instructions relating to accessing this library or to selecting instances from this library, may take the form of a software update to a pre-existing augmented-reality digital service, originally devoid of any temporal variation controls offered to the user.

Figure 3:
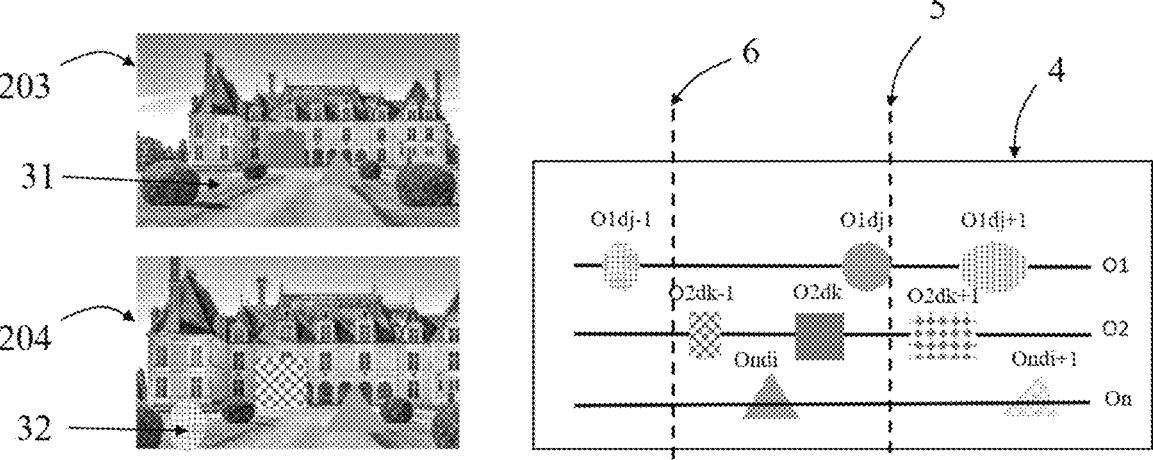
FIG. 3 shows an integration of instances of 3D temporal objects in two views of a scene, each view corresponding to a different chosen date, according to one embodiment.

Reference is now made to FIG. 3, which shows views 203, 204 of two scenes corresponding to two successive visual fields of a user moving towards the entrance of a chateau. We consider in this example that, between the first view 203 and the second view 204, the digital service takes into account a different date in the time coverage interval, meaning that the first view 203 corresponds to a first chosen date 5 and the second view 204, occurring later on, corresponds to a second different date 6.

In this example, the user has for example manually chosen the second chosen date 6 by means of a suitable human-machine interface. Generally speaking, the user may change the temporal frame of reference as desired, continuously or discontinuously, and at each of these changes, the instances of the 3D temporal objects are updated.

One can thus see that certain instances have been replaced from one view to another, while keeping the same positioning parameters in the scene. Such a replacement may be done by adjusting the spatial rendering, the brightness, or any other parameter of the new instance, based on the corresponding parameters of the previously rendered instance. As an example of such an adjustment, if a first instance of a 3D temporal object was seen from the side, then a second instance replacing this first instance is also seen from the side, with the same angle, the same level of magnification, etc.

Specifically, for the 3D temporal object denoted O1, the first instance 31 is present in the first view 203 but is no longer present in the second view 204. This means that the validity time interval of the first instance encompasses the first chosen date 5 but not the second chosen date 6. On the other hand, for this same 3D temporal object, the second instance 32, which was not present in the first view 203, becomes present in the second view 204. This means that the validity time interval of the second instance encompasses the second chosen date 6 but not the first chosen date 5.

In FIGS. 2 and 3, the instances of 3D temporal objects are inserted from the library 4 according to a current temporal frame of reference, denoted RTi. This current temporal frame of reference is positioned at the chosen date applicable to the current moment. Such a current temporal frame of reference is defined as having an origin, a direction, and a speed of evolution.

The frame of reference may have been chosen by a user, by means of various functions offered by the time variation commands at his or her disposal. Analogous to playing audio or video content, such functions may include play, fast forward, rewind, reposition, pause, etc. Generally speaking, the different parameters defining a temporal frame of reference (origin, direction, and speed of evolution from the chosen date) may all be made controllable by the time variation commands.

In one arbitrary example, the origin may be set at the year 1520, the direction of evolution may be towards the future, and the speed may be set at 1 year per second. At the initial moment, the chosen date corresponds to the origin, i.e. in this example the year 1520. At the next moment, the chosen date is shifted from the origin in the specified direction, by an increment which depends on the speed of evolution, i.e. for example the year 1521 after one second, or the year 1550 after 30 seconds.

Thus, continuing with this arbitrary example, if for example a currently selected instance has a validity time interval extending between the years 1490 and 1550, then the instance can only remain selected until the chosen date passively reaches 1550. Beyond that, the instance can no longer be part of the selected instances, and therefore can no longer be rendered for the user.

Similarly, if the user actively changes the chosen date, abruptly changing it for example from 1530 to 1400, then in the same manner an instance having a validity time interval extending between the years 1490 and 1550, initially selected when the chosen date was the year 1530, can no longer be part of the selected instances when the chosen date becomes the year 1400.

The above examples show that the overall user experience may comprise a succession of augmented reality experiences in a same geographical space but in dynamic temporal frames of reference. After a change to the temporal frame of reference, for a given 3D temporal object, the new chosen date serves as a basis for choosing the instance to be rendered, which is the one for which the validity time interval includes the chosen date. More specifically, the new chosen date may serve as a basis for choosing the appearance of the instance to be rendered, which is the one associated with a subinterval including the chosen date.

Figure 4:
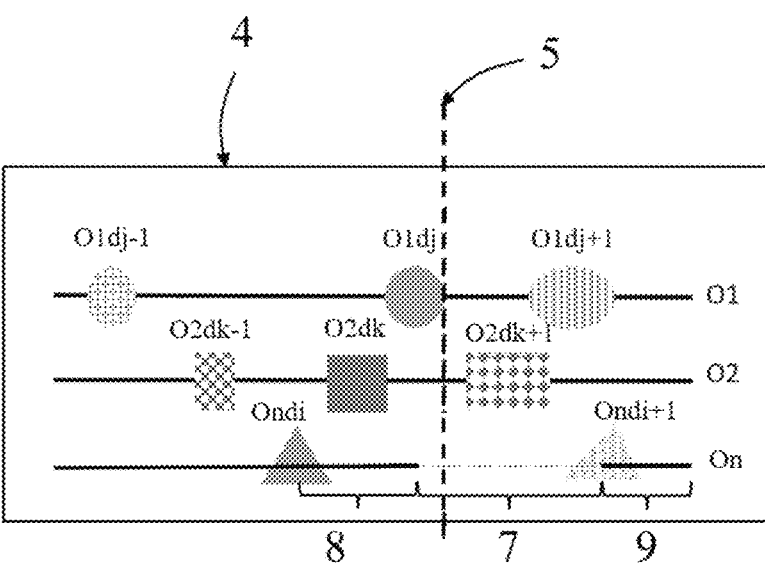
FIG. 4 shows a temporal instantiation of three 3D temporal objects from a library, according to one embodiment.

As a complementary example, reference is now made to FIG. 4, which represents a library 4 of 3D temporal objects.

The 3D temporal object denoted On comprises two instances. The first instance has a first validity time interval 8. The second instance has a second validity time interval 9. These two validity time intervals are disjoint, separated by an "empty" time interval 7, meaning that no instance of the 3D temporal object denoted On is defined within it.

Generally speaking, for a given 3D temporal object, one or more time intervals 7 may exist in which no instance is defined. In this case, when the chosen date 5 belongs to such a time interval, no instance of this 3D temporal object can be selected for rendering for the user.

We can imagine a current temporal frame of reference in which the chosen date evolves, first within the first validity time interval 8, then within the "empty" time interval 7, and finally within the second validity time interval 9. The selectable instances of the 3D temporal object denoted On are therefore, firstly only the first instance, then no instance, and lastly only the second instance.

Generally speaking, an evolution in the chosen date may cause, at the augmented-reality digital service:

a removal of a previously returned instance when the new chosen date exceeds the validity time interval, or an appearance of a new instance to be rendered when the new chosen date enters its validity time interval, or a replacement of a previously rendered instance, by a new instance to be rendered when the two above conditions are met simultaneously.

Figure 5:
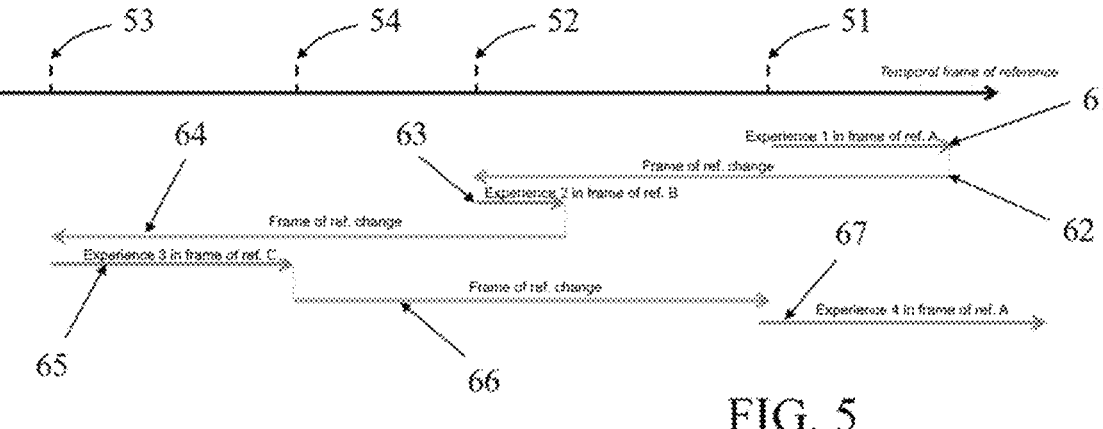
FIG. 5 shows an exemplary progression in an augmented reality experience in a virtual time frame, according to one embodiment.
Figure 6:
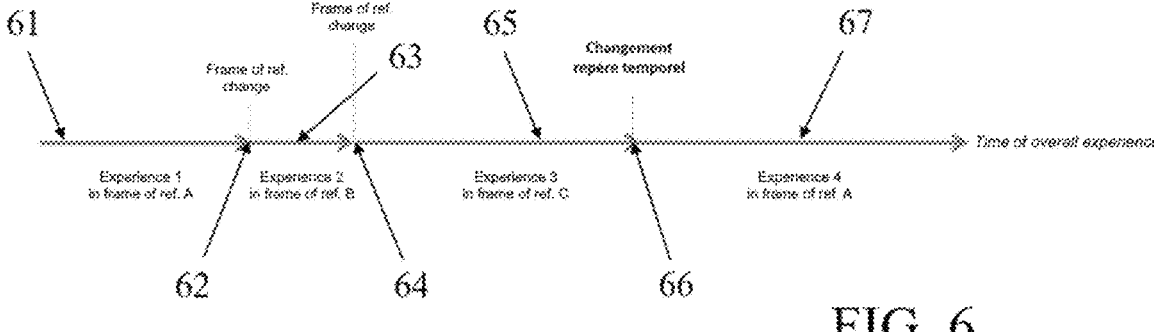
FIG. 6 shows, in a current time frame, the progression of the augmented reality experience mentioned in FIG. 5.

By way of illustration, reference is now made to FIGS. 5 and 6. FIG. 5 traces the evolution of the chosen date during an augmented reality experience in which a user makes several changes to the temporal frames of reference.

A first date 51, as the initial chosen date, marks the start of a first basic experience 61 of the user within a temporal frame of reference A. The first date 51 is the origin of temporal frame of reference A. The chosen date evolves towards the future at a given speed linked to temporal frame of reference A, until the user makes a first change 62 to the temporal frame of reference. This first change consists of setting a second date 52 as the new chosen date, which is the origin of a temporal frame of reference B. A second basic experience 63 then begins. During this second basic experience, the chosen date continues to evolve towards the future, within frame of reference B. The user then makes a second change 64 to the temporal frame of reference by assigning a third date 53 as the chosen date. A third basic experience 65 then takes place within a frame of reference C, having the third date as its origin. This third basic experience ends when the chosen date reaches a fourth date 54, and a new change 66 in the temporal frame of reference is implemented automatically, by a return to temporal frame of reference A. A fourth basic experience 67 then begins starting from the first chosen date 51.

One can see that the changes in the temporal frame of reference may either be implemented by a user in real time or may be triggered on the basis of prior instructions, for example when the chosen date corresponds to the end of a predefined experience. Changes to the temporal frame of reference may be towards the past or towards the future.

FIG. 6 shows the progression in the augmented reality experience of FIG. 5 as a function of the actual time elapsed from the user's point of view. The overall experience is a succession of basic experiences 61, 63, 65, 67 in different temporal frames of reference but with spatial continuity. Changes in the temporal frame of reference 62, 64, 66, or temporal discontinuities, mark the end of one basic experience and the beginning of the next.

At each evolution in the chosen date, and in particular at each change to the temporal frame of reference, it is provided that the instances of objects to be kept, deleted, replaced, or added are verified or recalculated.

This verification or this recalculation may be implemented in various ways.

For example, one effective way of allowing such verification without requiring access to the entire library of 3D temporal objects is to associate, with each instance, alerts which indicate the start and the end of the validity time interval.

Each alert may also be associated with one or more appropriate actions to be implemented, such as an addition, replacement, or deletion of an instance. For example, imagine the following for a same 3D temporal object:

an instance A associated with a first validity time interval extending from 11 a.m. to 11:20 a.m., an instance B associated with a second validity time interval extending from 11:20 a.m. to 11:30 a.m., and an instance C associated with a third validity time interval extending from 11:35 a.m. to 11:50 a.m.

Instance A may for example be associated with a first alert indicating the immediate replacement of instance A with instance B on the double condition that the chosen date corresponds to 11:20 a.m. and that the direction of evolution of the chosen date is towards the future.

Instance C may for example be associated with a second alert indicating to delete instance C without immediately replacing it with any other instance, on the dual condition that the chosen date corresponds to 11:35 a.m. and that the direction of evolution of the chosen date is towards the past. The second alert may also indicate, as an additional planned action, to add instance B when the chosen date reaches 11:30 a.m. if no change to the temporal frame of reference has been implemented in the meantime.

Generally speaking, as long as no change to the temporal frame of reference is requested by the user, the processing of such alerts may therefore be sufficient for correctly selecting the instances of objects to be rendered as a function of the evolution of the chosen date, regardless of whether this evolution is towards the past or towards the future.

The general principle, described above, of establishing alerts associated with an instance may also be applied for selecting the appropriate appearance of an instance on the basis of the chosen date.

Figure 7:
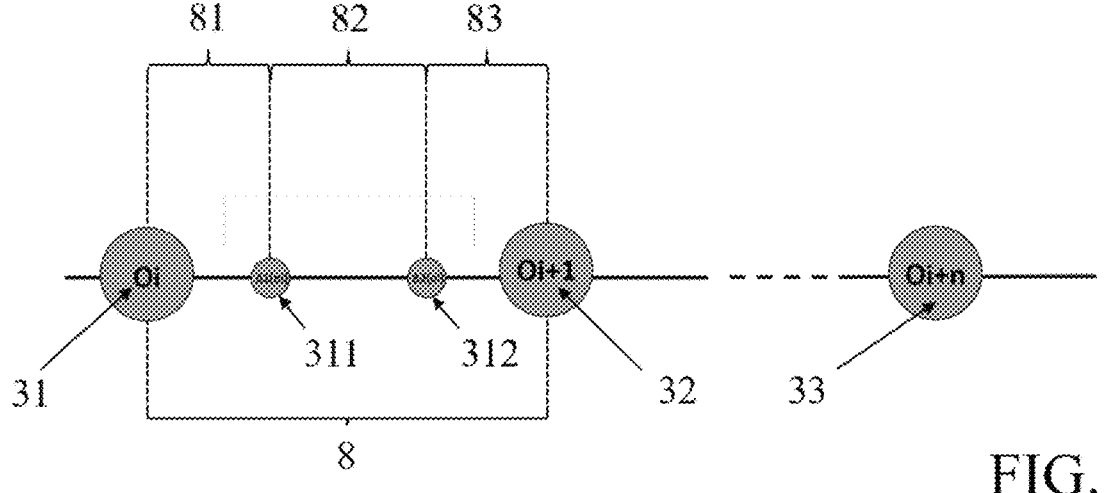
FIG. 7 shows a temporal instantiation of a 3D temporal object from a library, in an embodiment providing for an adjustment of the appearance of an instance according to a temporal subdivision of a validity interval of the instance.

To this end, reference is made to FIG. 7. FIG. 7 shows different instances 31, 32, 33 of a 3D temporal object on a timeline.

It is possible here to provide, for a given instance denoted Oi extending over a validity time interval, with the first instance 31 extending over the first validity time interval 8, one or more sets of parameters for modifying the appearance of the instance, denoted Δj(Oi), which govern the transitions between each possible appearance, or version, of the instance and the previous or next version of the instance.

In FIG. 7, the given instance has three different appearances, each corresponding to a subinterval 81, 82, 83 of the validity time interval. Two sets (311, 312) of parameters for modifying the appearance of the given instance are defined.

One set of parameters for modifying the appearance of an instance indicates one or more modifications to be made in relation to a previous or next version of the instance, depending on the direction of advancement in time: towards the past or towards the future. Such modifications may include texture changes and/or deformations. Processing this set of parameters makes it possible, within a given 3D temporal frame of reference and without changing the object instance, to provide an appearance of aging or rejuvenation, for example.

In the same manner that each object instance Oi is associated with a validity interval, the set of appearance modification parameters Δj(Oi) governing the transition between two given versions of a same instance is associated with a date associated with this transition. This is the start or end date of a subinterval, which may be defined either directly or indirectly. For example, a start or end date of a subinterval may be calculated by the difference with a start or end date of a previous or next interval or subinterval.

Thus, a set of appearance modification parameters 311 may define the modifications to be made to an appearance associated with a first sub-interval 81 when the chosen date changes from a past date to a future date and becomes equal to the transition date between the first sub-interval 81 and a second sub-interval 82.

The set of appearance modification parameters 311 may additionally or alternatively define the modifications to be made to an appearance associated with the second sub-interval 82 when the chosen date changes from a future date to a past date and becomes equal to the transition date between the second sub-interval 82 and the first sub-interval 81.

An alert may be provided for the case where the chosen date becomes equal to such a transition date. Such an alert triggers the processing of the appearance modification parameters Δj(Oi) associated with this transition date, and the appearance of the instance evolves, transitioning from the previously rendered version to the new version to be rendered.

In general, regardless of the evolution of the chosen date during the augmented reality experience, it is possible at each moment to verify the instances of valid, selectable objects, and optionally the valid appearance changes applicable to these instances.

Providing several appearances for a same instance which are not encoded in their entirety but are in the form of appearance change parameters relative to a previous or next appearance, represents a significant gain in terms of storage space at the library and a gain in terms of bandwidth in the link between the library and the augmented-reality digital service.

A parallel can be made with MPEG 2 coding, where certain images, said to be for internal coding, are encoded and transmitted to a decoder in their entirety, while for other images, said to be for predictive coding, only the differing elements are sent to the decoder. The decoder is then able to reconstruct such images by modifying a previously decoded image using these difference elements.

Figure 8:
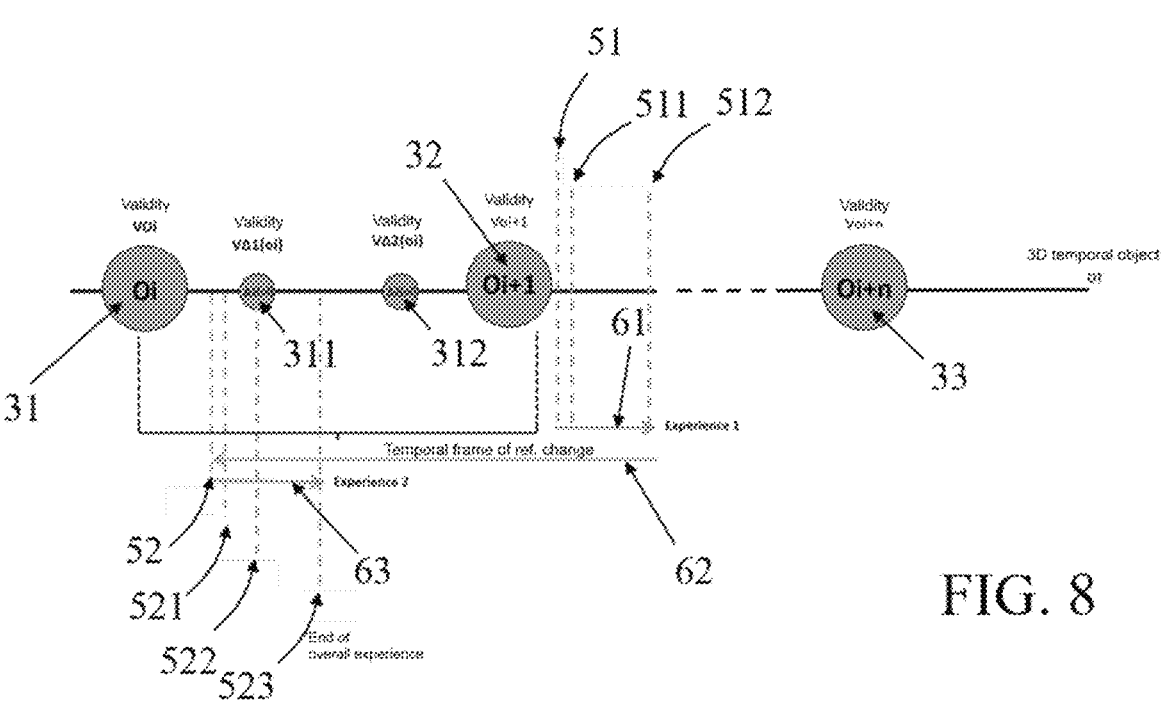
FIG. 8 shows an exemplary progression in an augmented reality experience in a virtual time frame, according to the embodiment of FIG. 7.
Figure 9:
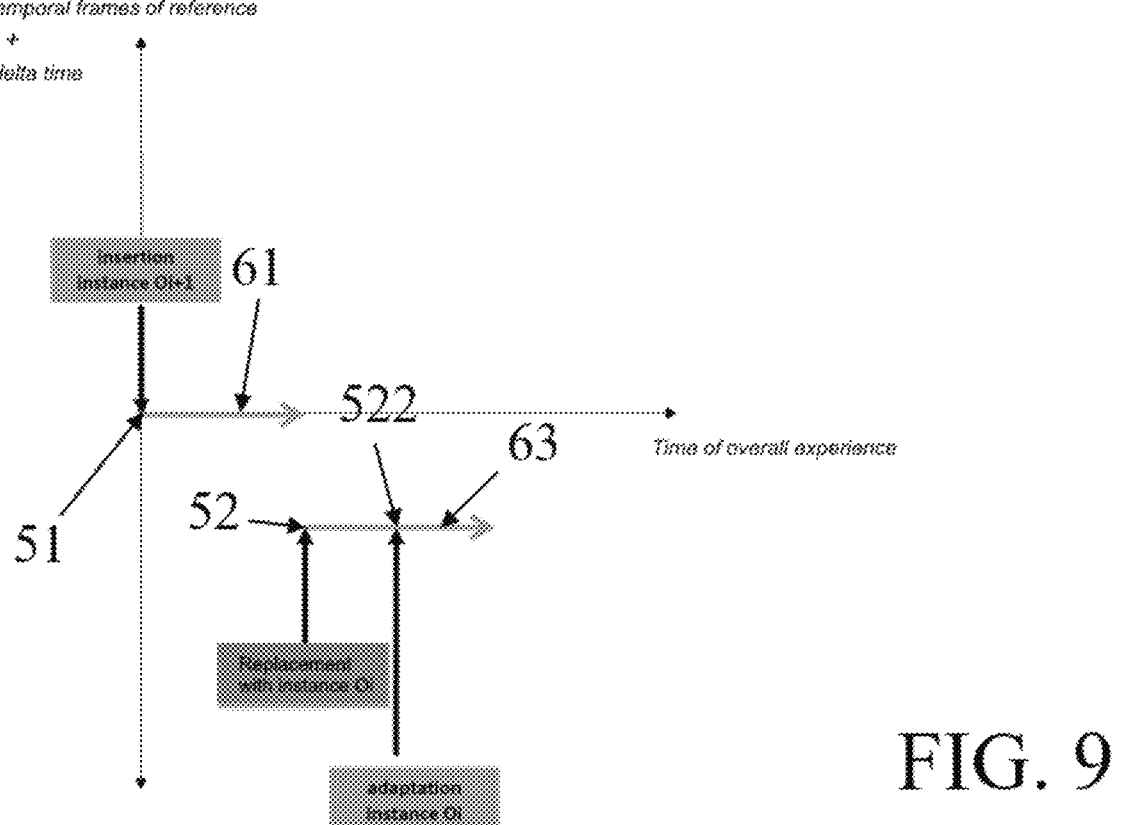
FIG. 9 shows, in a current time frame, an exemplary progression of the augmented reality experience mentioned in FIG. 8.

FIGS. 8 and 9 retrace, in a manner analogous to FIGS. 5 and 6, the evolution of the chosen date over a timeline during an augmented reality experience in which a user makes several changes in the temporal frames of reference. This evolution of the chosen date is analyzed as it relates to a 3D temporal object from the library comprising a first instance 31, a second instance 32, and a third instance 33. Unlike the example in FIGS. 5 and 6, the first instance 31 allows, here and as is also shown in FIG. 7, several possible appearances, in this case three. A first transition date 311 represents the end of a first subinterval associated with a first appearance and the beginning of a second subinterval associated with a second appearance. A second transition date 312 represents the end of the second subinterval and the beginning of a third subinterval associated with a third appearance.

The overall augmented reality experience begins on a first date 51 as the initial chosen date, which then evolves towards the future within a first temporal frame of reference. This evolution corresponds to a first basic experience (61) within the overall augmented reality experience. On this first date 51, the valid instance of the 3D temporal object is the second instance 32. This second instance 32 remains valid throughout the first basic experience, in particular at a first intermediate date 511 and at a second intermediate date 512.

At the end of the first basic experience, a change to the temporal frame of reference 62 is implemented. A second date 52 is defined as a new chosen date marking the start of a second basic experience 63. On the second date 52, the valid instance of the 3D temporal object is the first instance 31. The valid appearance of the 3D temporal object is a first appearance, its subinterval including the second date 52. The chosen date then evolves from the second date 52 towards the future. The first instance 31 remains valid throughout the second basic experience, in particular at a third intermediate date 521, at a fourth intermediate date 522, and at a final date 523.

However, even if no change of instance is made during the second basic experience, a change in appearance of the first instance 31 is made when the chosen date becomes equal to the fourth intermediate date 522, because this date coincides with the date of transition 311 from the first appearance to the second appearance.

In other words, and as shown in FIG. 9, the 3D temporal object concerned is first represented during the first basic experience 61 by the second instance 32. Then, during the second basic experience 62, the relevant 3D temporal object is represented by the first instance 31, firstly in its first appearance, then in its second appearance.

In the scenario thus described, the change to the temporal frame of reference is viewed, for the sake of simplification, as a discontinuity in the augmented reality experience, the chosen date first taking a value equal to the second intermediate date 512 then a value equal to the second date 52.

It is alternatively possible to treat a change to the temporal frame of reference as a continuous variation of the chosen date, from the last value of the chosen date just before the implementation of the change to the temporal frame of reference, to the first value of the chosen date once the change to the temporal frame of reference is finalized.

To choose between these two possibilities, it is useful to set a maximum admissible frequency for updating the instances, based on a performance criterion.

For example, the speed and time span of the evolution of the chosen date, in particular during a change to the temporal frame of reference, are parameters influencing the required performance in terms of computation time and/or of bandwidth for updating the instances within a reasonable time taking into account a target frequency for the augmented reality device's rendering of consecutive images.

In one example, a user having access to time variation commands transitions in 2 seconds from the current date to 300 years before. Such a particularly rapid change to the temporal frame of reference is then treated as a temporal discontinuity. The selection of instances and appearances to be rendered is then only carried out for the chosen date corresponding to the end of the change. It is thus possible to display, during the transition from the current time T to time T+2 seconds, a single adaptation of the 3D temporal objects of the scene, associated here with a single change.

In another example, a user having access to time variation commands transitions in 2 minutes from the current date to 20 years ago. Such a change to the temporal frame of reference is slow enough to be treated as a succession of temporal discontinuities, meaning an incremental change in the chosen date, from the current date to the targeted date. The adaptation of the object instances and their renderings may then be updated for example every n seconds, n being defined by hardware or software constraints relating to the augmented-reality digital service.

Different examples of augmented reality experiences that may be implemented at actual sites are now described.

Pierre is walking in the forest of Brocéliande, in a timeless landscape. Many legends, events, and people are associated with this place. During his actual walk on the paths, he chooses to experience them at different eras. He can move forward or backward in time as desired, the objects which increase the reality of what he sees through his glasses thus transitioning from one era to another, at his request.

Jeanne is visiting Versailles. The rooms are furnished in the style of Louis XVI. Her augmented reality experience begins slightly earlier, after the chateau is completed. Jeanne, like every visitor, has the possibility of moving time forward or backward during the reigns of several kings. 3D historical people are associated with this visit, having different instances depending on the dates and according to the person (child or adult). Thus Jeanne can visit each room seeing the people who lived there, as if they were present: she adjusts time to see them young, older, then possibly young again in order to live this experience at her own pace, according to her desires. She's the one in charge.

Rose and Suzie are visiting a location together. They both can freely adjust the temporal frame of reference as desired.

They do not make the same choices, one preferring to jump forward and then backward in time very quickly and the other preferring to stay within a same period, even if this means only slightly accelerating the speed of the time that passes. In this visit they will have walked side by side throughout the entire trip, but will not have had the same multi-temporal experience.

Figure 10:
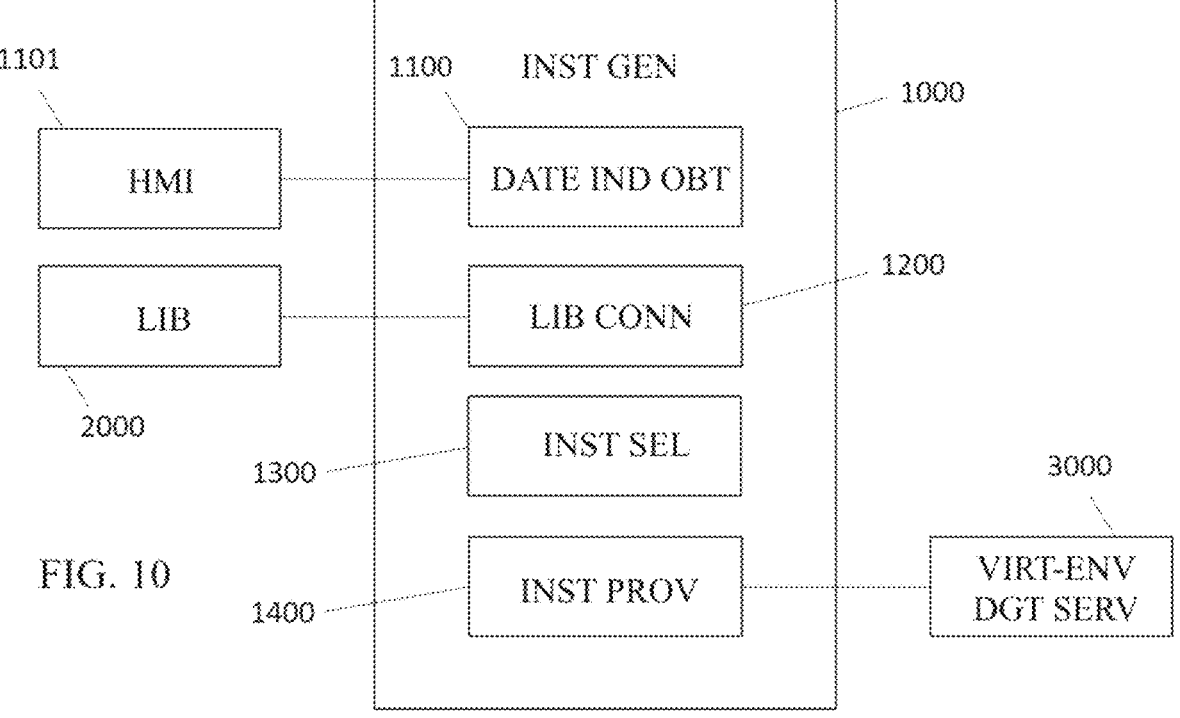
FIG. 10 shows an instance generator according to one embodiment.

An example of a system for implementing the proposed method is now described, in conjunction with FIG. 10.

The system comprises different logical entities, which are:
an instance generator 1000,
a library of temporal objects 2000, and
a virtual-environment digital service 3000.

The virtual-environment digital service 3000 is a service adapted to render a virtual environment, immersive or non-immersive, for one or more users. The virtual-environment digital service may be based on any known technologies such as, for example, augmented reality, virtual reality, or holography. The rendering may be carried out using any suitable devices. In particular, devices are known that are adapted for such rendering and are portable for a user, such as a virtual reality headset or augmented reality glasses.

The library of temporal objects 2000 is a library listing a plurality of temporal objects as defined in this description. For example, the library may comprise files corresponding to different instances of different temporal objects. Alternatively, the library may for example comprise pointers to memory or network addresses where such files are stored. Each instance of a given temporal object is also associated, in the library, with a validity time interval.

The instance generator 1000 comprises an obtainer of a chosen date indication 1100. The obtainer 1100 designates a logical entity, comprising for example a logic instruction that provides for reading the chosen date indication in a memory, or that provides for interpreting a digital signal received from a human-machine interface 1101 and indicating the chosen date. Optionally, the obtainer may be configured to obtain the chosen date indication upon request, for example upon a request to initialize or update the chosen date, said request being for example received from the human-machine interface 1101 or from a remote server. The obtainer 1100 may involve the use of a physical entity, for example a communication interface capable of receiving a digital signal indicative of the chosen date.

The instance generator also comprises a connector 1200 to the library 2000. The connector 1200 designates a logical entity, comprising for example a logical instruction that provides for obtaining, via the library 2000, at least one given instance of a given temporal object.

The connector 1200 may for example be configured to obtain, via the library, all instances of the given temporal object as well as their validity time intervals.

The instance generator 1000 may comprise an instance selector 1300 configured to select, based on the chosen date for which an indication has previously been obtained via the obtainer 1100 and from among the obtained instances of the given temporal object, the instance for which the validity time interval encompasses said chosen date.

Alternatively, the obtainer 1100 and the selector 1300 may be integrated into the library 2000 rather than into the generator 1000. Thus, considering that the library 2000 already has the chosen date indication previously obtained via the obtainer 1100, the connector 1200 may be configured to obtain for a given temporal object, via the library, only the instance for which the validity time interval encompasses the chosen date.

In all the embodiments mentioned, the instance generator generates, for a given temporal object, an instance associated with a validity time interval that includes the chosen date.

The instance generator 1000 also comprises a provider 1400 for providing the generated instance to the virtual-environment digital service 3000. Here, the provider 1400 simply designates a communication link capable of and configured for transmitting the generated instance to the digital service 3000. The generated instance is transmitted to the digital service 3000 either as such, or as a pointer to a memory or network address where the generated instance is accessible to the digital service.

INDUSTRIAL APPLICATIONS

The field of application is that of augmented reality for the general public and for professionals, for entertainment and for training.

This disclosure is not limited to the examples described above, but encompasses all variants conceivable to those skilled in the art within the context of the protection sought.

The invention claimed is:

1. A method of temporal instantiation for a virtual-environment digital service, the method comprising:
providing the virtual-environment digital service with an instance, generated on the basis of a chosen date indication, of a temporal object associated with a validity time interval including the chosen date within a predefined time coverage interval, a temporal object comprising a plurality of instances, an instance being an object associated with a validity time interval forming a continuous portion of the time coverage interval, the validity time intervals associated with the instances of a same temporal object being non-overlapping;
detecting a transition of the chosen date relative to a temporal boundary associated with a temporal object; and
updating a rendering of the temporal object in the virtual environment based on the chosen date resulting from the transition.

2. The method according to claim 1, comprising, when the date associated with the virtual environment changes during reproduction of the virtual environment, as soon as the current moment in the virtual environment leaves the validity time interval associated with the rendered instance of a temporal object in the reproduced virtual environment, the providing of a new instance of the temporal object associated with a validity time interval including the chosen date, the new instance having been generated on the basis of the date corresponding to the current moment in the virtual environment being reproduced, the validity time intervals associated with the provided instance and with the new instance being contiguous.

3. The method according to claim 1, comprising:
obtaining the chosen date on the basis of a signal received from a human-machine interface.

4. The method according to claim 1, comprising:
adjusting an appearance of at least one selected instance according to a criterion based on associated data about a temporal evolution of the instance's appearance within the validity time interval of the selected instance and on the chosen date.

5. The method according to claim 1, comprising:
selecting, from a library of temporal objects, the instance associated with the validity time interval which includes the chosen date.

6. The method according to claim 5, further comprising, when accessing the library of temporal objects prior to selecting an instance:

filtering the library so as to preselect only the temporal objects for which an instance is associated with a validity time interval which includes the chosen date, and the selection being made among the preselected temporal objects in the filtered library.

7. The method according to claim 1, further comprising:

updating the chosen date on the basis of a request to change the chosen date, the updated chosen date being used when providing an instance of a temporal object associated with a validity time interval that includes the updated chosen date.

8. The method according to claim 7, wherein the request to change the chosen date is obtained on the basis of a signal received from a human-machine interface.

9. The method according to claim 7, wherein:

the updating of the chosen date is based on data indicative of a speed of variation of the chosen date.

10. The method according to claim 9, wherein the updating of the chosen date is carried out according to an update mode that is dependent on the data indicative of a speed of variation of the chosen date.

11. The method according to claim 7, wherein:

a first instance of a given temporal object having been provided prior to an updating of the chosen date, the first instance being associated with an indication of a limit date corresponding to a start and/or an end of the validity time interval associated with the first instance, the method further comprising, if the updated chosen date is beyond the limit date:

providing the virtual-environment digital service with information relating to an instance at the updated chosen date, the information relating to an instance at the updated chosen date comprising a second instance when the temporal object comprises a second instance having a validity time interval comprising the updated chosen date.

12. The method according to claim 7, wherein:

an instance of a given temporal object having been provided prior to an updating of the chosen date, the instance being associated with an indication of an intermediate date that is based on temporal evolution data about the instance appearance within the validity time interval, and the method further comprising, if the updated chosen date is beyond the intermediate date:

adjusting an appearance of the instance according to a criterion based on the temporal evolution data about the instance appearance and based on the updated chosen date.

13. The method according to claim 7, wherein:

no instance of a given 3D temporal object having been provided prior to an updating of the chosen date, the method further comprises, if the updated chosen date is beyond a limit date corresponding to a start and/or an end of the validity time interval associated with a given instance:

providing the given instance to an augmented-reality digital service with a view to rendering it for the user.

14. A non-transitory computer-readable storage medium storing instructions, the instructions, when executed on a data processing circuit, causing the data processing circuit to perform a method of temporal instantiation for a virtual-environment digital service when the instructions are executed, the method comprising:

providing the virtual-environment digital service with an instance, generated on the basis of a chosen date indication, of a temporal object associated with a validity time interval including the chosen date within a predefined time coverage interval, a temporal object comprising a plurality of instances, an instance being an object associated with a validity time interval forming a continuous portion of the time coverage interval, the validity time intervals associated with the instances of a same temporal object being non-overlapping;

detecting a transition of the chosen date relative to a temporal boundary associated with a temporal object; and updating a rendering of the temporal object in the virtual environment based on the chosen date resulting from the transition.

15. An instance generator intended for a virtual-environment digital service, the instance generator comprising:

a provider, to the virtual-environment digital service, of an instance, generated on the basis of a chosen date indication, of a temporal object associated with a validity time interval including the chosen date within a predefined time coverage interval, a temporal object comprising a plurality of instances, an instance being an object associated with a validity time interval forming a continuous portion of the time coverage interval, the validity time intervals associated with the instances of a same temporal object being non-overlapping;

a detector of a transition of the chosen date relative to a temporal boundary associated with a temporal object; and an updater of a rendering of the temporal object in the virtual environment based on the chosen date resulting from the transition.

* * * * *